(12) United States Patent
Mauchly et al.

(10) Patent No.: US 8,830,293 B2
(45) Date of Patent: Sep. 9, 2014

(54) VIDEO SUPERPOSITION FOR CONTINUOUS PRESENCE

(75) Inventors: J. William Mauchly, Berwyn, PA (US); Richard Thayer Wales, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1506 days.

(21) Appl. No.: 12/471,567

(22) Filed: May 26, 2009

(65) Prior Publication Data
US 2010/0302446 A1    Dec. 2, 2010

(51) Int. Cl.
| H04N 7/14 | (2006.01) |
| H04N 9/74 | (2006.01) |
| H04N 21/4788 | (2011.01) |
| H04N 21/44 | (2011.01) |
| H04N 7/15 | (2006.01) |
| H04N 21/4402 | (2011.01) |
| H04N 21/422 | (2011.01) |
| H04N 21/4223 | (2011.01) |

(52) U.S. Cl.
CPC ............ H04N 7/15 (2013.01); H04N 21/4788 (2013.01); H04N 21/44008 (2013.01); H04N 7/147 (2013.01); H04N 21/440263 (2013.01); H04N 21/42203 (2013.01); H04N 21/4223 (2013.01)
USPC ....................................... 348/14.07; 348/586

(58) Field of Classification Search
CPC .......... G09G 2340/02; G09G 2340/04; G09G 2340/10; G09G 2340/12; G09G 2340/125; G09G 2340/407; G09G 2340/442; G09G 2340/045; G09G 2340/0464; G09G 2340/0492; H04N 5/45; H04N 19/00757; H04N 21/434; H04N 21/47; H04N 5/44508; H04N 7/15; H04N 7/147; H04N 21/2365; H04N 21/23614; H04N 5/272; H04N 5/2628; H04M 3/567; G06T 3/40; G06T 3/4023; G06T 7/0022

USPC .......... 348/14.01, 14.02, 14.05, 14.07, 14.09, 348/14.1, 14.14, 14.15, 14.16, 14.08, 14.13, 348/452, 552, 575, 576, 578, 581, 584, 348/586; 345/629, 630, 660, 668, 670, 671
See application file for complete search history.

(56) References Cited

U.S. PATENT DOCUMENTS

| 5,572,248 | A | * | 11/1996 | Allen et al. | 348/14.1 |
| 2008/0048975 | A1 | * | 2/2008 | Leibow | 345/156 |
| 2008/0095470 | A1 | * | 4/2008 | Chao et al. | 382/298 |
| 2009/0033737 | A1 | * | 2/2009 | Goose et al. | 348/14.07 |

FOREIGN PATENT DOCUMENTS

WO    0137559 A1    5/2001

* cited by examiner

*Primary Examiner* — George Eng
*Assistant Examiner* — Hung Du
(74) *Attorney, Agent, or Firm* — Edell, Shapiro & Finnan, LLC

(57) ABSTRACT

Techniques are described herein for combining video frames of two or more real-time video streams into combined video frames of a combined real-time video stream for continuous presence. Video frames of at least two real-time video streams are combined into combined video frames of a combined video stream. The combined video stream is supplied to a video display for displaying the combined video stream. Each video stream includes video frames with subject and background images. The subject images of corresponding video frames of the first and second video streams are combined into a combined video frame of a combined video stream such that the subject image of the first video stream is positioned in an anterior portion of the combined frame and the subject image of the second video stream is positioned in a posterior portion of the combined frame.

20 Claims, 9 Drawing Sheets

VIDEO SUPERPOSITION FOR CONTINUOUS PRESENCE

TECHNICAL FIELD

The present disclosure relates to video teleconferencing systems and particularly to multiple video source and continuous presence teleconference systems.

BACKGROUND

Videoconferencing allows two or more locations to interact via simultaneous two-way video and audio transmissions. In videoconferencing systems, it is desirable to see the other party in near life-size on a display screen. However for videoconferences with many participants, the size of the display screen becomes a limiting factor as to the image area allocated to each participant. Several known systems offer solutions to this limiting factor of the display screen, however, with compromised features. For example, some solutions allow only a limited number of meeting participants to be viewed on the screen at a time. Other solutions display all the meeting participants on the screen using the "Hollywood Squares" feature to provide continuous presence, however, this feature merely provides an arrangement where rectangular video areas of individual people are reduced in size according to the number of participants and stacked both vertically and horizontally to fit the screen.

DETAILED DESCRIPTION

Overview

An apparatus, system, methods, and logic are described herein that are configured to combine corresponding video frames of two or more real-time video streams into combined video frames of a combined video stream for continuous presence functionality useful in, for example, video conference systems. The underlying technique involves receiving at least first and second real-time video streams, combining the subject images of video frames of the first and second video streams into combined video frames of a combined video stream, and supplying the combined video stream to a video display for displaying the combined video stream. The first and second real-time video streams are derived from respective first and second video cameras. Each of the first and second real-time video streams comprises video frames containing a picture comprising a subject image and a background image. The method further comprises combining the subject images of corresponding video frames of the first and second video streams into a combined frame of a combined video stream such that the subject image of the first video stream is positioned in an anterior portion of the combined frame and the subject image of the second video stream is positioned in a posterior portion of the combined frame. The combined video stream is also a real-time video stream that represents a combination of the first and second real-time video streams, and the combined real-time video stream is supplied to a display. When the subject images of the first and second real-time video streams each comprises images of multiple persons involved in video conference session, the combined video stream presents the images of these persons during real-time display in a more life-like manner that is more natural and pleasing to view during a video conference session.

Example Embodiments

Teleconference is a term used to relate to the live exchange and mass articulation of information among persons and machines remote from one another but linked by a telecommunications system (e.g., phone line, internet, ISDN, etc.). Teleconferences involving video exchange, also referred to as videoconferences or videoteleconferences, allow two or more locations to interact via simultaneous two-way video and audio transmissions. Although teleconferencing is typically employed to serve groups of individuals, teleconferencing may likewise be employed to serve individual users at the remote locations.

Figure 1:
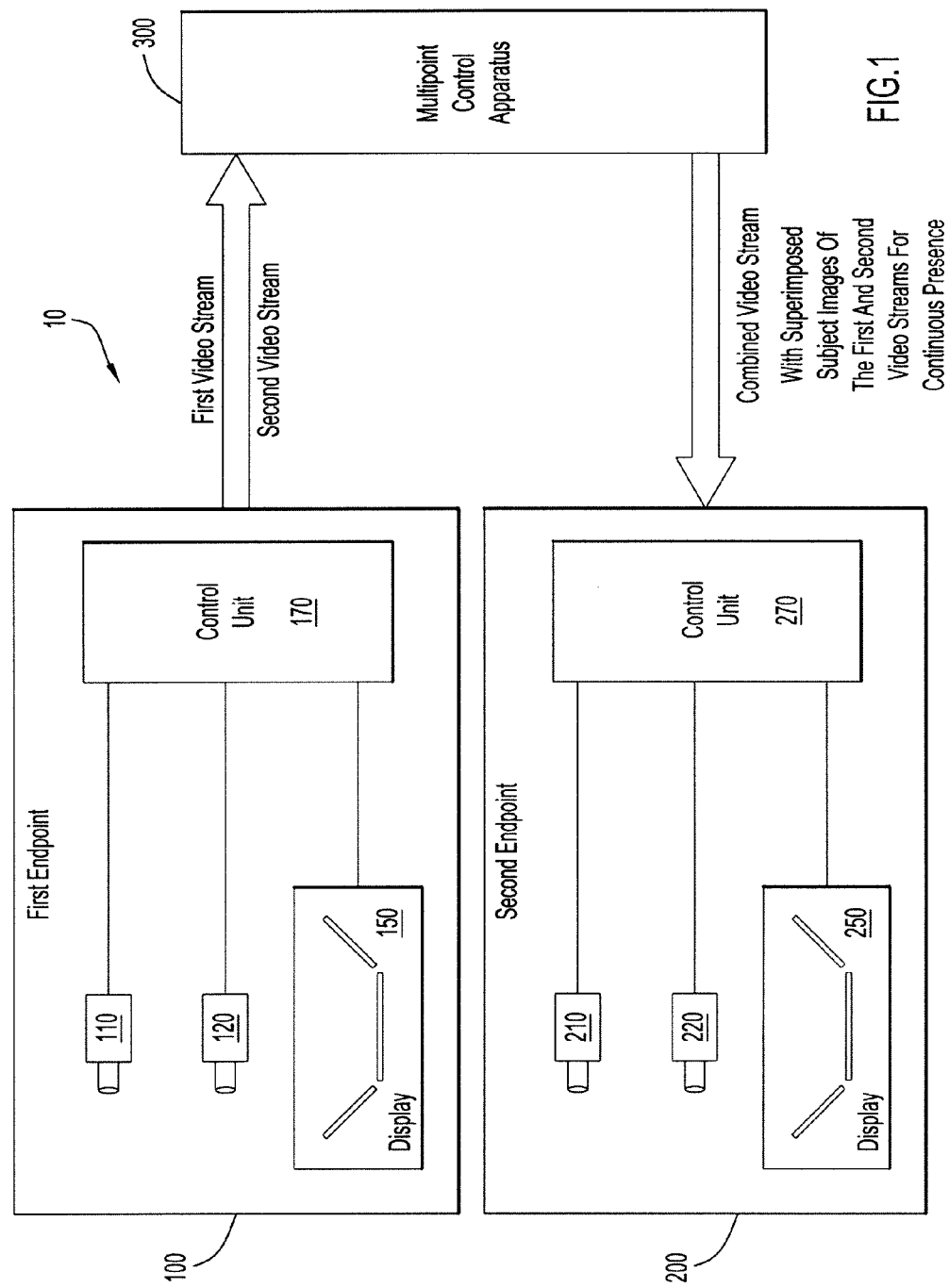
FIG. 1 is a block diagram depicting an example of a video distribution system configured to combine video streams for continuous presence.

Referring first to FIG. 1, a video distribution system 10 is shown that is configured to combine video streams according to the techniques described herein. The system 10 may be used to conduct video conferences between multiple endpoints, where the video streams transmitted between the endpoints are high-fidelity or high-quality video, thereby simulating an in-person meeting, known as a "telepresence" meeting.

The video distribution system 10 comprises a first endpoint 100, a second endpoint 200, and a multipoint control apparatus 300 (e.g., multipoint control unit (MCU)). Each of the endpoints 100, 200 can simultaneously serve as both a source and a destination of a video stream. It is to be understood that audio also can be captured by one or more microphones (not shown) and encoded into the video streams passed between endpoint devices. Endpoint 100 includes a plurality of video cameras including video cameras 110, 120, a control unit 170, and a display 150. Endpoint 200 includes a plurality of video cameras including video cameras 210, 220, a control unit 270, and a display 250. The video cameras 110, 120 capture video and supply first and second video signals to control unit 170. The control unit 170 is configured to encode the video signals into first and second video streams of the first endpoint 100, and to forward the first and second video streams of the first endpoint 100 to the multipoint control apparatus 300. The multipoint control apparatus 300 is configured to combine at least portions of corresponding video frames of the first and second video streams of the first endpoint into combined video frames of a combined video stream according to the techniques described herein. Video frames of the first and second video streams may correspond, for example, in a temporal manner such that the video frames of the first video stream are captured at substantially the same time as the video frames of the second video stream. The control unit 270 is configured to receive and decode the combined video stream of the first endpoint and forward the combined video stream to the display 250 that is configured to receive and render the combined video stream of the first endpoint for viewing.

Conversely, the control unit 270 is further configured to receive and encode video signals of the video cameras 210, 220 of the second endpoint 200 into first and second video streams of the second endpoint 200 and forward these video streams of the second endpoint 200 to the multipoint control apparatus 300. The multipoint control apparatus 300 is further configured to combine at least portions of corresponding video frames of the first and second video streams of the second endpoint 200 into combined video frames of a combined video stream of the second endpoint 200 to be forwarded to the control unit 170 of the first endpoint 100. The control unit 170 is further configured to receive and decode the combined video stream of the second endpoint 200 and forward the combined video stream to the display 150 that is configured to receive and render the combined video stream of the second endpoint 200 for viewing.

It is to be understood that the components of the video distribution system 10 may be distributed over a wide area network (e.g., WAN, internet, etc.) or may be distributed over a local area network (LAN) within a same facility (e.g., building, campus, etc.). Furthermore, the video distribution network 10 may be operable with any network protocol (e.g., internet protocol (IP) based, integrated services data network (ISDN) based, etc.). It is to be further understood that the components of the video distribution system 10 (e.g., first and second control units, multipoint control apparatus, video cameras, video displays, etc.) providing video frames and combining of real-time video streams as described herein may include any quantity of any conventional or other components and may process and distribute the video stream employing any suitable protocol and over any suitable energy form (e.g., optical signals, microwave, radio signals, etc.).

Each of the real-time video streams, as described above, comprises video frames including a subject image and a background image. The subject image may include one or more images in a foreground portion of a video frame (e.g., video conference participants sitting at a conference table). The background image may include any image in a background portion of the video frame (e.g., a backdrop, a wall, a scene, etc.) and may further include all remaining portions of the video frame not included in the subject image. The multipoint control apparatus 300 is configured to combine the subject images of corresponding video frames of the first and second video streams into combined video frames of a combined video stream, such that a subject image of the video frame of one of the first and second video streams is positioned in an anterior portion of the combined video frame and the subject image of the video frame of the other one of the video streams is positioned in a posterior portion of the combined video frame. Video frames of the first and second video streams may correspond, for example, in a temporal manner such that the video frames of the first video stream are captured at substantially the same time as the video frames of the second video stream. In other forms, the control units at the respective endpoints 100, 200 are configured to combine the subject images of the respective video streams in this manner.

Figure 2:
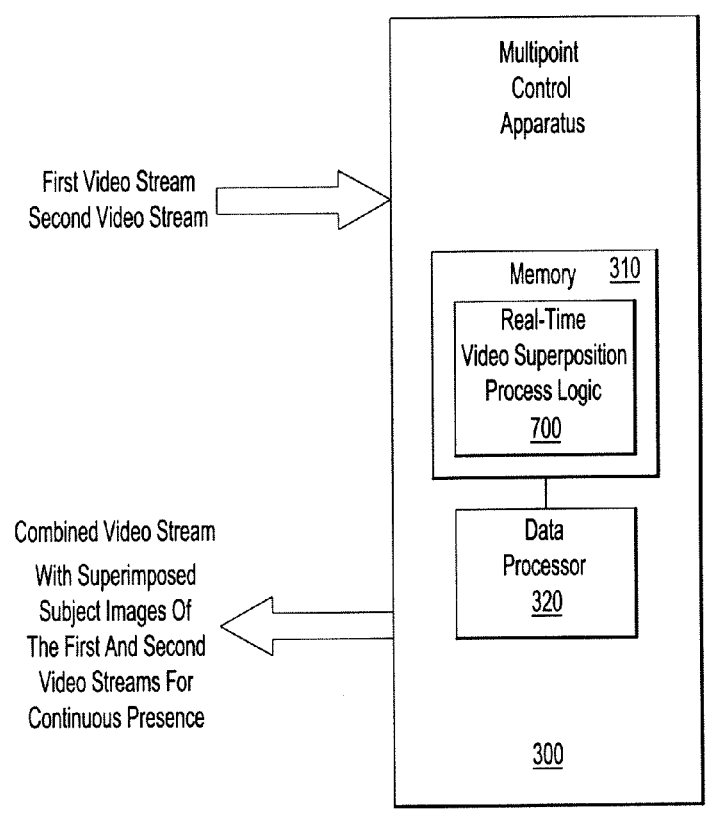
FIG. 2 is a block diagram depicting an example of a multipoint control apparatus configured to combine video streams for continuous presence.

Next, referring to FIG. 2, the multipoint control apparatus 300 is described in more detail. The multipoint control apparatus 300 comprises a memory 310 and a data processor 320. The memory 310 contains real-time video superposition process logic 700. The data processor 320 executes the logic 700 to perform the real-time video superposition functions described herein, to thereby combine corresponding video frames of at least first and second video streams into video frames of a combined video stream. By executing logic 700, the multipoint control apparatus 300 is operable to combine corresponding video frames of video streams of two or more remote endpoints such that multiple subject images (e.g., multiple videoconference participants) can be seen on screen at once (i.e., continuous presence) without substantially reducing the size of each subject image. In another form, rather than the multipoint control apparatus 300 combining the subject images, the control units 170, 270 of the respective endpoints 100, 200 may be configured with the logic 700 and the subject images of corresponding video frames may be combined via the logic 700 of the respective endpoints 100, 200.

It is to be understood that the video distribution components (e.g., first and second control units, multipoint control apparatus, data processor, etc.) of the present invention may be implemented by any quantity of any conventional or other components performing the functions described herein. These components may be implemented in hardware and/or software by any processors and/or circuitry. Alternatively, the multipoint control apparatus and first and second control units may include software and/or hardware modules to implement any individual function or any combinations of these functions. The multipoint control apparatus may reside as an external module disposed at any suitable location in the video distribution system and coupled to components thereof or may be integrated with any desired components of the video distribution system.

It will also be appreciated that the multipoint control apparatus 300 may be implemented by any conventional or other microprocessor, controller or circuitry to perform the functions described herein, while any quantity of processors or processing devices or circuitry may be employed within one or more of the video distribution processing devices, where the multipoint control apparatus functions may be distributed in any fashion among any quantity of hardware or software modules, processors or other processing devices or circuits. Accordingly, the multipoint control apparatus 300 may, for example, be embedded in a multipoint control unit (MCU), a dedicated video teleconference (VTC) unit or may be a stand alone hardware device.

Furthermore, the video distribution system 10 may be implemented over a network, for example, via a "decentralized multipoint" (e.g., H.323 technique), where each endpoint in a multipoint call exchanges video and audio directly with the other endpoints with no central "manager" and the multipoint control apparatus 300 can combine corresponding video frames of two or more video streams into a combined video frame of a combined video stream.

Figure 3:
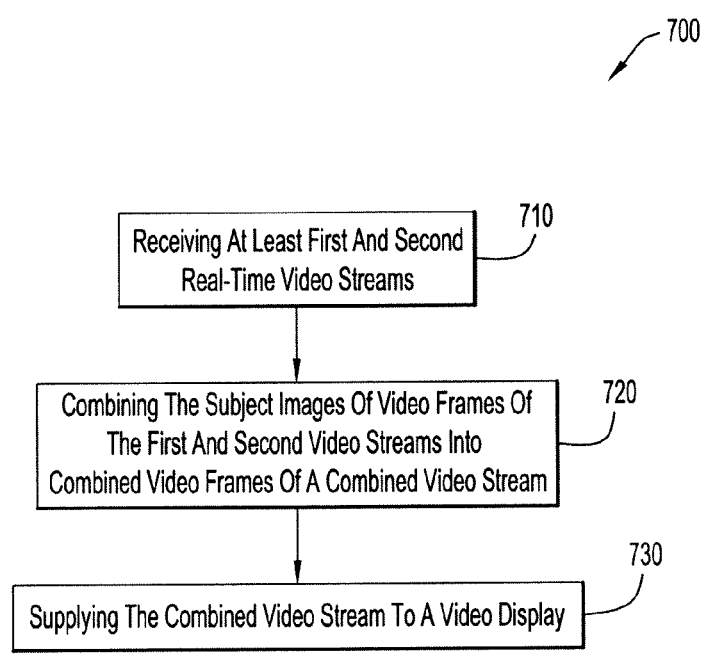
FIG. 3 is an example flow chart for a real-time video superposition process that combines real-time video streams for continuous presence.

FIG. 3 is a flowchart for the real-time video superposition process logic 700. At 710, first and second real-time video streams are received, for example, from two separate video cameras at an endpoint. At 720, the subject images of video frames of the first and second video streams are combined into combined corresponding video frames of a real-time combined video stream. At 730, the combined video stream is supplied to a video display.

For example, at 720 two video frames (e.g., rectangular in shape) of a same original size of two separate video streams are combined into a combined video frame of a combined video stream, the combined video frame having a frame size equal to the original frame size. The video frames of the two separate video streams may be slightly scaled, e.g., greater than half scale or near life-size, in other words, substantially close to full scale. Consequently, the subject images and background images of the scaled video frames are likewise slightly scaled. The scaled video frames of the separate video streams are combined into a combined video frame of a combined video stream such that one of the video frames of the two video streams is superimposed over the other one of the video frames. Moreover, the subject images of the scaled video frames are superimposed such that the subject images of one of the scaled video frames is positioned in an anterior portion of the combined video frame and the subject image of the other one of the scaled video frames is positioned in a posterior portion of the combined video frame.

For example, the superimposed subject images of the combined video frame may be scaled to near life-size and arranged such that the subject images appear to be sitting in the same room one in front of another (e.g., individuals seated in stadium seating). This arrangement of subject images of combined video frames of a combined video stream may be rendered on a display with a same frame size as the original video frames of the two video streams. The rendered combined video stream shown on the display provides a viewer an illusion that the subject images (e.g., images of teleconference participants) are situated one in front of another of the same room (e.g., stadium seating) and allows for continuous presence. It is to be understood, however, that the subject images of the combined video frames may be derived from video streams generated at a same endpoint or generated at different endpoints.

By contrast, some conventional systems employ techniques such as "switching" between multiple video sources, while maintaining the size (e.g., "life-size" or close to "life-size") of the subject images (e.g., videoconference participants) of the real-time video on the display screen. However, this conventional technique does not allow for continuous presence since the subject images on display screen change as the video sources are switched. By further contrast, other conventional videoconferencing systems offer continuous presence solutions where subject images of all the participants are visible at the same time on the display screen but the subject images (e.g., images of the videoconference participants) are proportionately reduced in size according to the number of participants. Conventional continuous presence techniques typically employ the feature called "Hollywood Squares" referring to an arrangement where rectangular video areas of individual people are reduced in size and stacked both vertically and horizontally. In addition to the problem of the smaller sized images, the vertical arrangement has no analog in daily life and breaks any illusion that the participants are in the same room together. Still other conventional techniques rely on the physical arrangement of the seating of the video participants (e.g., stadium or theater seating) in order to fit more video participants into a single video "shot" of a video camera. However, even these techniques come with compromises, for example, the cost and space limitations associated with providing stadium seating and the fact that those participants sitting in different rows of the stadium seating can not face one another.

Combining the video frames, as described herein, takes advantage of the unused space between subject images (e.g., the background behind and between images of teleconferencing participants) of a single video frame of a single video stream and allows for more subject images to appear in one combined video frame. In addition, the combined frame of the combined video streams may further include subject images of the remaining video streams of the at least first and second video streams arranged, for example, in a cascaded manner between the subject images of the first and second video streams. Furthermore, the arrangement and order of subject images of the different video streams in the combined video frame may be designated. For example, a designated subject image of a video stream may be positioned in the anterior portion of the combined video frame. Further still, this designation may be automated based on predetermined criteria, or may be actuated via user input (e.g., key entry, voice activation, voice recognition, facial recognition, hand geometry recognition, etc.).

Furthermore, combining the video frames of two video streams may further comprise modifying the subject image of video frames of one of the first and second real-time video streams. For example, modifying the subject image of the video frame may include identifying at least two portions of the subject image of the video frames to be modified, separating the at least two identified portions, and arranging the separated portions with adjusted relative positions (e.g., move the separate portions of the subject image closer together or move the separate portions farther apart) to form a video frame with a modified subject image.

It is to be understood that the functions of logic 700 described herein may be performed by digital logic in a hardware/firmware form, such as with fixed digital logic gates in one or more application specific integrated circuits (ASICs), or programmable digital logic gates, such as in a field programming gate array (FPGA), or any combination thereof. Furthermore, the real-time video superposition process logic 700 described herein may be encoded on tangible media (e.g., magnetic or optical mediums, magneto-optic mediums, floppy diskettes, CD-ROM, DVD, memory devices, etc.), and/or may be downloaded (e.g., in the form of carrier waves, packets, etc.) to systems via a network or other communications medium.

It will also be appreciated that the techniques described herein may employ combining video frames into a combined video stream of any desired video stream in any video distribution system and may utilize any desired protocol (e.g., OpenCU, H.320, H.323, 3G-324M, Farsight, RTP, etc.). Further, the techniques described herein may combine any number of video streams in any order according to any predetermined criteria (e.g., first to join the conference call, location, priority code, etc.) or may be manually selected by the viewer. Further, the combined video stream may be a combination of any number of video streams and may be combined and rendered in any order of video streams.

Figure 4:
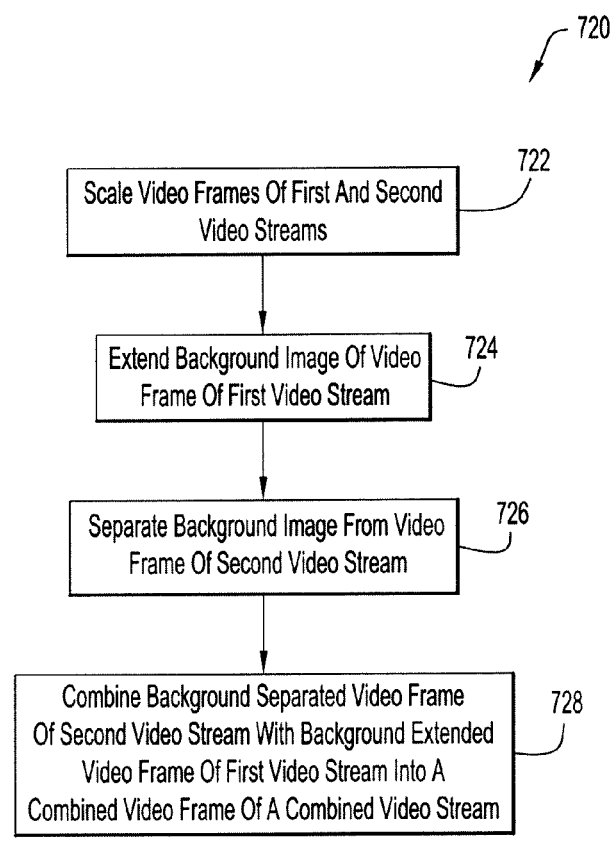
FIG. 4 is an example flow chart that depicts operations associated with a first method for combining subject images of corresponding video frames of first and second real-time video streams as part of the real-time video superposition process of FIG. 3.

FIG. 4 is a flowchart depicting a first method 720 of combining the subject images of corresponding video frames into a combined video frame. As explained above, video frames of the first and second video streams may correspond, for example, in a temporal manner such that the video frames of the first video stream are captured at substantially the same time as the video frames of the second video stream. At 722, the video frames of first and second video streams are scaled. At 724, the background image of the video frame of the first video stream is extended. At 726, the background image is separated from the video frame of the second video stream. At 728, the background separated video frame of the second video stream and the background extended video frame of the first video stream are combined into a combined video frame of a real-time combined video stream.

FIGS. 5A-5G illustrate corresponding video frames of real-time video streams with subject images being combined into a combined video frame according to the method depicted by the flowchart of FIG. 4.

Figure 5A:
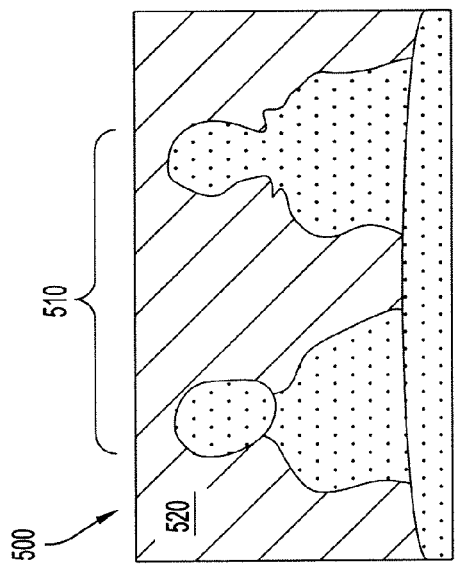
FIGS. 5A-5G are illustrations depicting examples of corresponding video frames of first and second real-time video streams being combined into a combined video frame of a combined real-time video stream according to the method of FIG. 4.
Figure 5B:
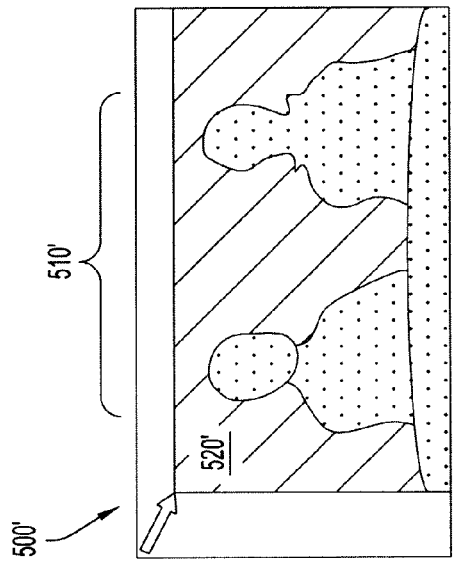
Figure 5C:
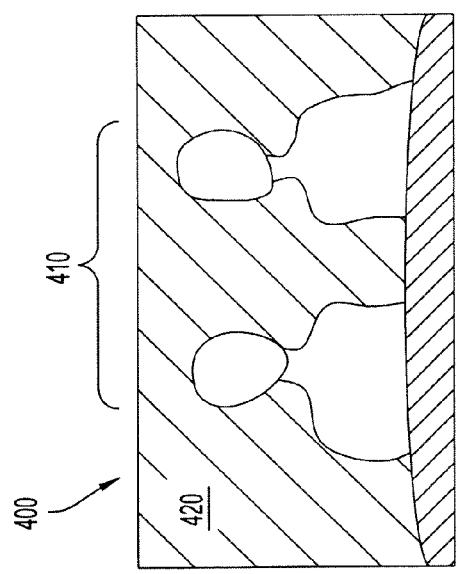
Figure 5D:
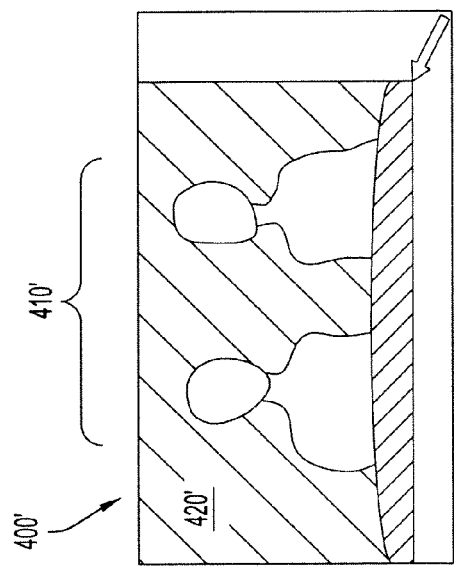

FIG. 5A depicts a video frame 400 of a first real-time video stream. Video frame 400 includes subject image 410 comprising, for example, images of two videoconference participants, and background image 420. Similarly, FIG. 5B depicts a video frame 500 of a second real-time video stream. Video frame 500 includes subject image 510 comprising, for example, images of two videoconference participants different from those in video frame 400, and background image 520. FIG. 5C illustrates the scaling function 722 applied to video frame 400 of the first real-time video stream. Scaled video frame 400' includes a scaled subject image 410' and scaled background image 420'. FIG. 5D illustrates the scaling function 722 applied to video frame 500 of the second real-time video stream. The scaled video frame 500' includes scaled subject image 510' and scaled background image 520'.

Figure 5E:
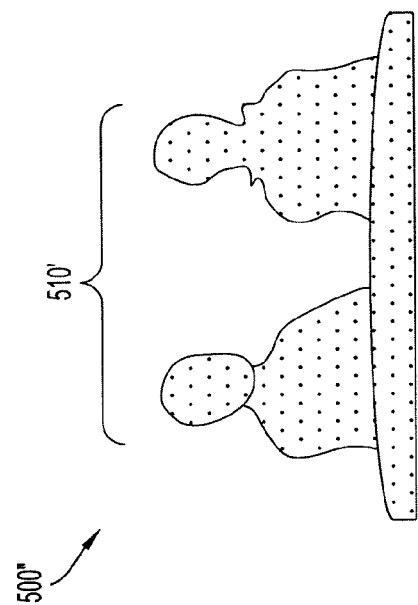

FIG. 5E illustrates the background extension function 724 applied to the scaled background image 420' of the scaled video frame 400' of the first real-time video stream. In other words, at 724, the background image of the scaled video frame 400' is extended, for example, to the original frame size to fill the portions of the frame that were lost due to scaling of the video frame 400 at 722, resulting in the background extended video frame 400". Extending of the background image of the scaled video frame 400' may be performed via a video enhancing technique (e.g., inpainting).

Inpainting may be accomplished, for example, by creating a static filler image that will occupy the border surrounding the scaled video image. It is desirable that the extended portion of the background image appears as an extension of the physical background of the video shot. In the event that the physical background of the video shot is a still object (e.g., a wall), the static filler image can be generated, for example, via a still video frame of the physical background without subject images having been arranged in the foreground of the video shot. Inpainting may also be accomplished, for example, by selecting and copying a portion of the video frame and flipping (i.e., reversing) the copied portion about an axis of reflection (e.g., a horizontal axis, vertical axis, etc.) to arrange the copied portion in an area of the video frame to be extended. Consequently, the pixels of the copied portion which were flipped about the axis of reflection will match those of the selected portion in a mirrored image fashion, thereby providing a smooth transition of the background image. Accordingly, this process may be carried out more than once and may be reflected about different axis of reflection (e.g., a horizontal axis, vertical axis, etc.) until the background is extended to the desired extent (e.g., the original frame size).

Figure 5F:
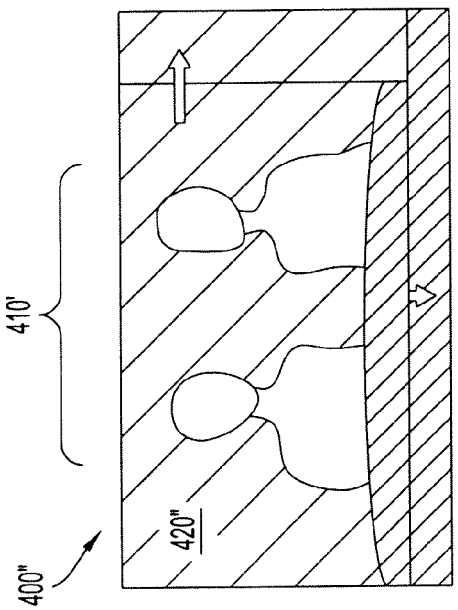

FIG. 5F illustrates a background separated video frame 500" of the second real-time video stream that results from the background separation function 726. In other words, the background image 520 is separated from the scaled subject image 510' of the scaled video frame 500' of the second video stream resulting in a background separated video frame 500" of the second real-time video stream.

Figure 5G:
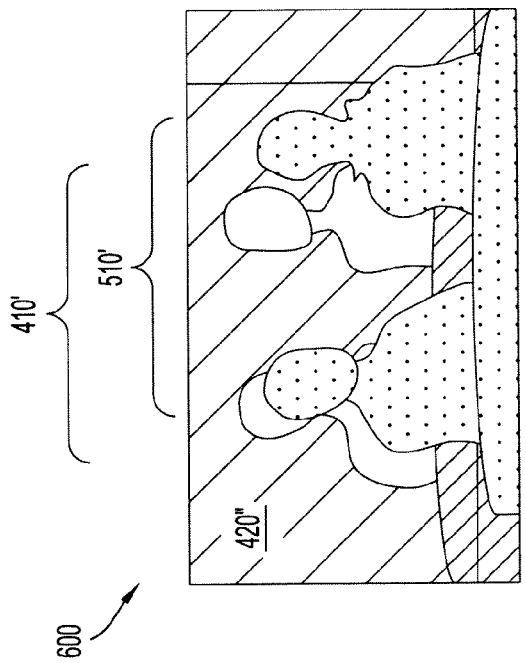

FIG. 5G illustrates a combined video frame that results from the combining function 728, where the background extended video frame 400" of the first video stream shown in FIG. 5E is combined with the background separated video frame 500" of the second video stream shown in FIG. 5F into a combined video frame 600 of the combined video stream. The combined video frame 600 includes the scaled subject image 510' of the second video stream in an anterior portion and the scaled subject image 410' and the extended background image 420" of the video frame of the first video stream in a posterior portion. In other words, FIG. 5G shows the combined video frame 600 with the scaled subject image 510' of the second video stream superimposed over the scaled subject image 410' and extended background image 420" of the first video stream.

There are numerous techniques that may be used for background separation. Background separation of a video frame, as described herein, may be accomplished, for example, via video segmentation techniques, such as blue screen segmentation, pixel comparison, etc.

Blue screen background segmentation is performed, for example, by video capturing the subject images in front of a blue screen (e.g., a large flexible curtain of a predetermined solid color). The image processing used in separating the background image is sensitive to a particular shade and intensity of the predetermined color (e.g., bright blue, bright green, etc.). During the image processing of the background separation of the video frames, any pixels that match the designated screen color are labeled as background pixels while all other pixels are labeled as foreground. The background separated video frames can be achieved, for example, by removing the background labeled pixels from the video frame.

Pixel comparison background segmentation can be performed, for example, by video capturing and storing a picture of the background without any objects in the foreground. The image processing used in separating the background image includes comparing the color and intensity of each pixel of the video frame of a video stream to the corresponding pixel of the stored background image. In the event that the colors of the compared pixels match, the corresponding pixel of the video frame of the video stream is labeled as a background pixel. All the corresponding pixels of the video frame of the video stream that do not match the pixels of the stored background image are labeled as a foreground pixel.

In background segmentation, pixels adjacent the edges of the foreground object can be ambiguous and consequently cause artifacts to appear. A technique called alpha matting allows pixels to have some amount of transparency, a property called an "alpha value". A pixel at the edge of a foreground object may have, for example, a 50% alpha value, which means that pixel color will be a mixture of half of the foreground color and half of the background color. Alpha matting provides a way to provide smooth transitions at the edges of foreground objects, making them appear more natural. Other background separating techniques include, but are not limited to, motion sensitive background segmentation, alpha blending, and Bayesian matting. It is to be understood that background segmentation of a video frame of a real-time video stream may be performed using any number of these described or other techniques now known or herein developed and in any combination.

Figure 6:
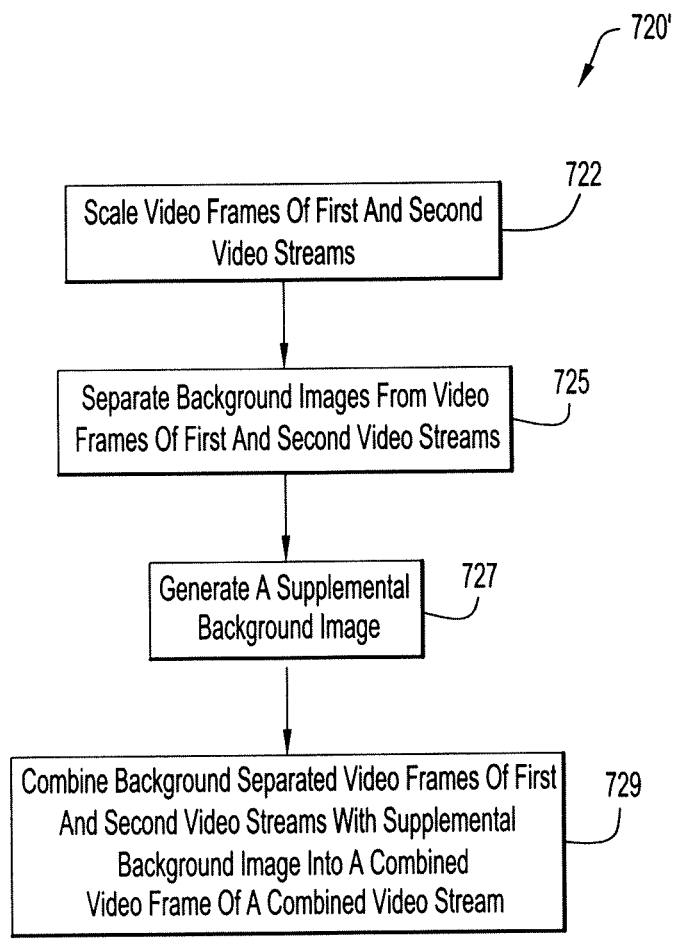
FIG. 6 is an example flow chart that depicts operations associated with a second method for combining subject images of corresponding video frames of first and second real-time video streams as part of the real-time video superposition process of FIG. 3.

FIG. 6 is a flowchart for a second method 720' of combining subject images of corresponding video frames into a combined video frame. At 722, the video frames of first and second video streams are scaled. At 725, the background images of the video frames of both the first and second real-time video streams are separated. At 727, a supplemental background image is generated. At 729, the background separated video frames of the first and second real-time video streams are combined with the supplemental background image into a combined video frame of a combined real-time video stream.

Figure 7A:
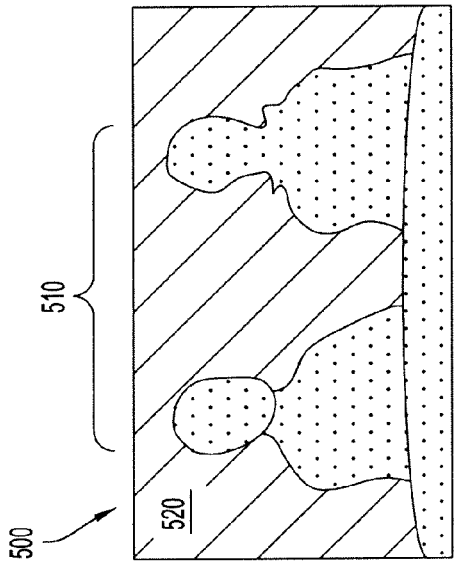
FIGS. 7A-7H are illustrations depicting examples of corresponding video frames of first and second real-time video streams being combined into a combined video frame of a combined real-time video stream according to the method of FIG. 6.
Figure 7B:
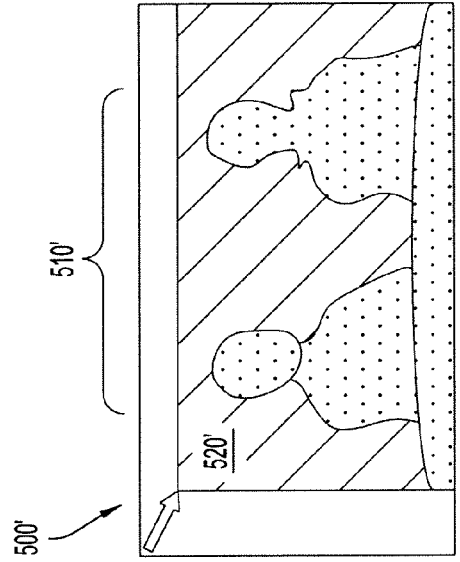
Figure 7C:
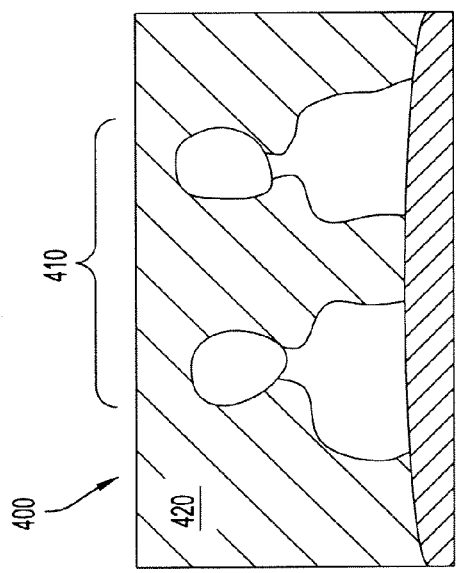
Figure 7D:
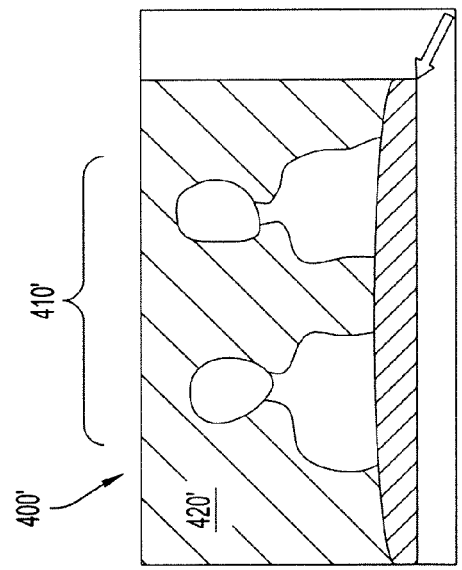

FIGS. 7A-7H illustrate corresponding video frames of real-time video streams with subject images being combined into a combined video frame according to the method described in the flowchart of FIG. 6. FIG. 7A illustrates a video frame 400 of a first real-time video stream. Video frame 400 includes subject image 410 and background image 420. FIG. 7B illustrates a video frame 500 of a second real-time video stream. Video frame 500 includes subject image 510 and background image 520. FIG. 7C illustrates a scaled video frame 400' of the first real-time video stream resulting from the scaling function of 722. Scaled video frame 400' includes a scaled subject image 410' and a scaled background image 420'. FIG. 7D illustrates a scaled video frame 500' of the second real-time video stream resulting from the scaling function of 722. Scaled video frame 500' includes a scaled subject image 510' and a scaled background image 520'.

Figure 7E:
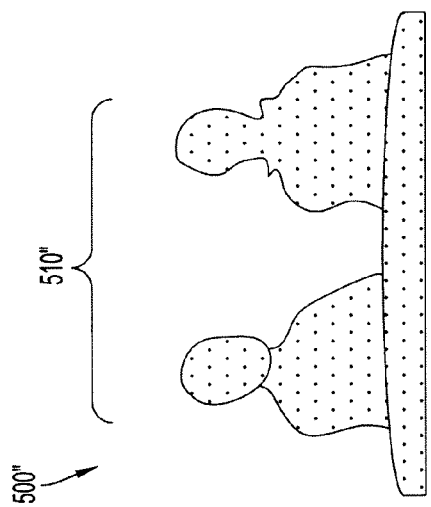
Figure 7F:
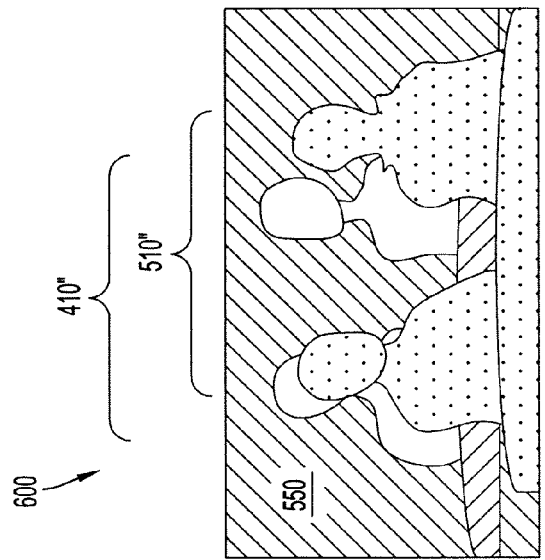

FIG. 7E illustrates a background separated video frame 401 of the first real-time video stream resulting from the background separation function 725. The background separated video frame 401 includes the scaled subject image 410'. FIG. 7F illustrates a background separated video frame 500" of the second real-time video stream resulting from the background separation function 725. The background separated video frame 500" of the second video stream comprises the scaled subject image 510'.

Figure 7G:
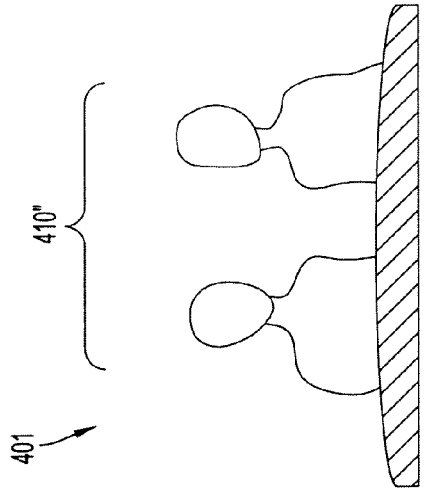

FIG. 7G illustrates an example of a supplemental background image 550 generated at function 727. The supplemental background image 550 is generated to be at least the size required to fill the backgrounds of combined video frames of the background separated video frames 401, 500" of the first and second video streams (e.g., the original size of the full scale video frames of the video streams).

Figure 7H:
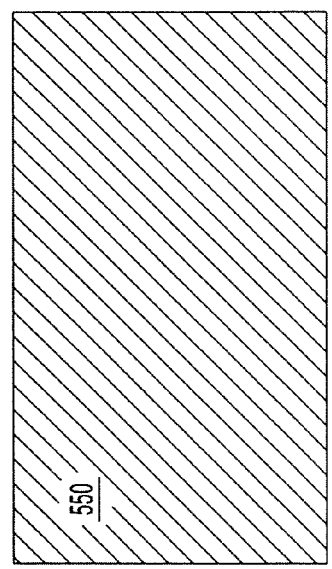

FIG. 7H illustrates an example of a combined video frame resulting from the combining function 729. The combined video frame 600 comprises the combined background separated subject images 410", 510" of FIGS. 7E and 7F onto the supplemental background image 550 shown in FIG. 7G. For example, the combined video frame 600 includes the background separated subject image 510" of the second video stream being arranged in an anterior portion, the supplemental background image 550 in a posterior portion, and the background separated subject image 410" of the first video stream in an intermediate portion.

It will be appreciated that the examples described above and illustrated in the drawings represent only a few of the many ways of implementing combining video frames of real-time video streams. Furthermore, the techniques described above and illustrated in the flow charts may be modified in any manner that accomplishes the functions described herein.

It is to be understood that the methods, apparatus, and logic described herein are not limited to the applications described herein, but may be utilized for various applications (e.g., on demand or live streaming video). Further, the methods, apparatus, and logic described herein may be used in any data communication system in which combining of video frames of video streams is desired. In addition, it is to be understood that the functions or methods described herein may be performed in any desired order. Similarly, it is to be understood that the functions or methods recited in the claims may be performed in any desired order.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   receiving at least first and second real-time video streams, each of the first and second real-time video streams comprising video frames containing a picture comprising a subject image and a background image;
   combining the subject images of corresponding video frames of the first and second video streams into a combined frame of a combined video stream such that the subject image of the first video stream is positioned in an anterior portion of the combined frame and the subject image of the second video stream is positioned in a posterior portion of the combined frame, wherein the combining comprises:
   scaling the video frames of the first video stream and repositioning in a first direction the resulting pictures in the video frames of the first video stream to produce a first sequence of scaled video frames;
   removing the background image in the first sequence of scaled video frames to produce first background separated video frames to be displayed in the anterior portion of the combined frames of the combined video stream; and
   superimposing the first background separated video frames onto corresponding ones of the video frames of the second video stream to produce combined video frames of the combined video stream; and
   supplying the combined video stream to a video display for displaying the combined video stream.

2. The method of claim 1, wherein the subject image of video frames of the first video stream comprises images of multiple videoconference participants and the subject image of video frames of the second video stream comprises images of multiple videoconference participants.

3. The method of claim 1, wherein combining comprises:
   scaling the video frames of the second video stream and repositioning in a second direction the resulting pictures in the video frames of the second video stream to produce a second sequence of scaled video frames;
   extending the background image in the second sequence of scaled video frames to produce background extended video frames to be displayed in the posterior portion of the combined frames of the combined video stream; and
   superimposing the first background separated video frames onto corresponding ones of background extended video frames to produce combined video frames of the combined video stream.

4. The method of claim 3, wherein the second direction is opposite to the first direction.

5. The method of claim 1, wherein combining further comprises:
   removing the background image in the video frames of the first and second video streams to produce first and second background separated video frames;
   generating supplemental background image video frames that comprise a supplemental background image; and
   superimposing corresponding ones of the first background separated video frames and the second background separated video frames onto corresponding ones of the supplemental background video frames to produce the combined video frames of the combined video stream.

6. The method of claim 1, wherein the first and second video streams are produced at a same video conferencing site.

7. The method of claim 1, wherein the first and second video streams are produced at different video conferencing sites.

8. The method of claim 1, wherein combining is performed at a site other than where the first and second video streams are produced.

9. The method of claim 1, wherein the subject images of video frames of the first and second video streams are images of video conference participants.

10. An apparatus comprising:
a first memory configured to store data for at least first and second real-time video streams, each of the first and second real-time video streams comprising video frames containing a picture comprising a subject image and a background image; and
at least one data processor configured to:
combine the subject images of corresponding video frames of the first and second video streams into a combined frame of a first combined video stream such that the subject image of the first video stream is positioned in an anterior portion of the combined frame and the subject image of the second video stream is positioned in a posterior portion of the combined frame, wherein the at least one data processor is configured to combine the subject images of video frames by:
scaling the video frames of the first video stream and repositioning in a first direction the resulting pictures in the video frames of the first video stream to produce a first sequence of scaled video frames;
removing the background image in the first sequence of scaled video frames to produce first background separated video frames to be displayed in the anterior portion of the combined frames of the combined video stream; and
superimposing the first background separated video frames onto corresponding ones of the video frames of the second video stream to produce combined video frames of the combined video stream.

11. The apparatus of claim 10, wherein the at least one data processor is configured to combine the subject images of video frames by:
scaling the video frames of the second video stream and reposition in a second direction the resulting pictures in the video frames of the second video stream to produce a second sequence of scaled video frames;
extending the background image in the second sequence of scaled video frames to produce background extended video frames to be displayed in the posterior portion of the combined frames of the combined video stream; and
superimposing the first background separated video frames onto corresponding ones of background extended video frames to produce combined video frames of the combined video stream.

12. A system comprising the apparatus of claim 10, and further comprising:
a first video conferencing endpoint configured to communicate with the apparatus, the first endpoint including:
a first video camera configured to generate the first real-time video stream, wherein the subject image of the first real-time video stream comprises an image of a first video conferencing participant at the first endpoint;
a second video camera configured to generate the second real-time video stream, wherein the subject image of the second real-time video stream comprises an image of a second video conferencing participant at the first endpoint; and
a first control unit configured to forward the first and second real-time video streams to the apparatus; and
a second video conferencing endpoint configured to communicate with the apparatus, the second endpoint including:
a second control unit configured to receive the combined video stream of the apparatus; and
a display configured to receive and render the combined video stream from the control unit.

13. Logic encoded in one or more tangible non-transitory storage media for execution and when executed operable to:
receive at least first and second real-time video streams, each of the first and second real-time video streams comprising video frames containing a picture comprising a subject image and a background image;
combine the subject images of corresponding video frames of the first and second video streams into a combined frame of a combined video stream such that the subject image of the first video stream is positioned in an anterior portion of the combined frame and the subject image of the second video stream is positioned in a posterior portion of the combined frame, wherein the subject images are combined by:
scaling the video frames of the first video stream and repositioning in a first direction the resulting pictures in the video frames of the first video stream to produce a first sequence of scaled video frames;
removing the background image in the first sequence of scaled video frames to produce first background separated video frames to be displayed in the anterior portion of the combined frames of the combined video stream; and
superimposing the first background separated video frames onto corresponding ones of the video frames of the second video stream to produce combined video frames of the combined video stream; and
supply the combined video stream to a video display for displaying the combined video stream.

14. The logic of claim 13, wherein the logic that receives is configured to receive video frames of the first video stream comprising images of multiple videoconference participants in the subject image and video frames of the second video stream comprising images of multiple videoconference participants in the subject image.

15. The logic of claim 13, wherein the logic that combines is configured to:
scale the video frames of the second video stream and reposition in a second direction the resulting pictures in the video frames of the second video stream to produce a second sequence of scaled video frames;
extend the background image in the second sequence of scaled video frames to produce background extended video frames to be displayed in the posterior portion of the combined frames of the combined video stream; and
superimpose the first background separated video frames onto corresponding ones of background extended video frames to produce combined video frames of the combined video stream.

16. The logic of claim 15, wherein the second direction is opposite to the first direction.

17. The logic of claim 13, wherein the logic that combines is configured to:
remove the background image in the video frames of the first and second video streams to produce first and second background separated video frames;
generate supplemental background image video frames that comprise a supplemental background image; and
superimpose corresponding ones of the first background separated video frames, and the second background separated video frames onto corresponding ones of the supplemental background video frames to produce the combined video frames of the combined video stream.

18. The logic of claim 13, wherein the first and second video streams are produced at the same video conferencing site.

19. The logic of claim 13, wherein the first and second video streams are produced at different video conferencing sites.

20. The logic of claim 13, wherein the logic that combines is configured to be performed at a site other than where the first and second video streams are produced.

* * * * *